March 13, 1951     C. A. WINSLOW     2,545,185
TROLLING GEAR
Filed Oct. 30, 1947     2 Sheets-Sheet 2
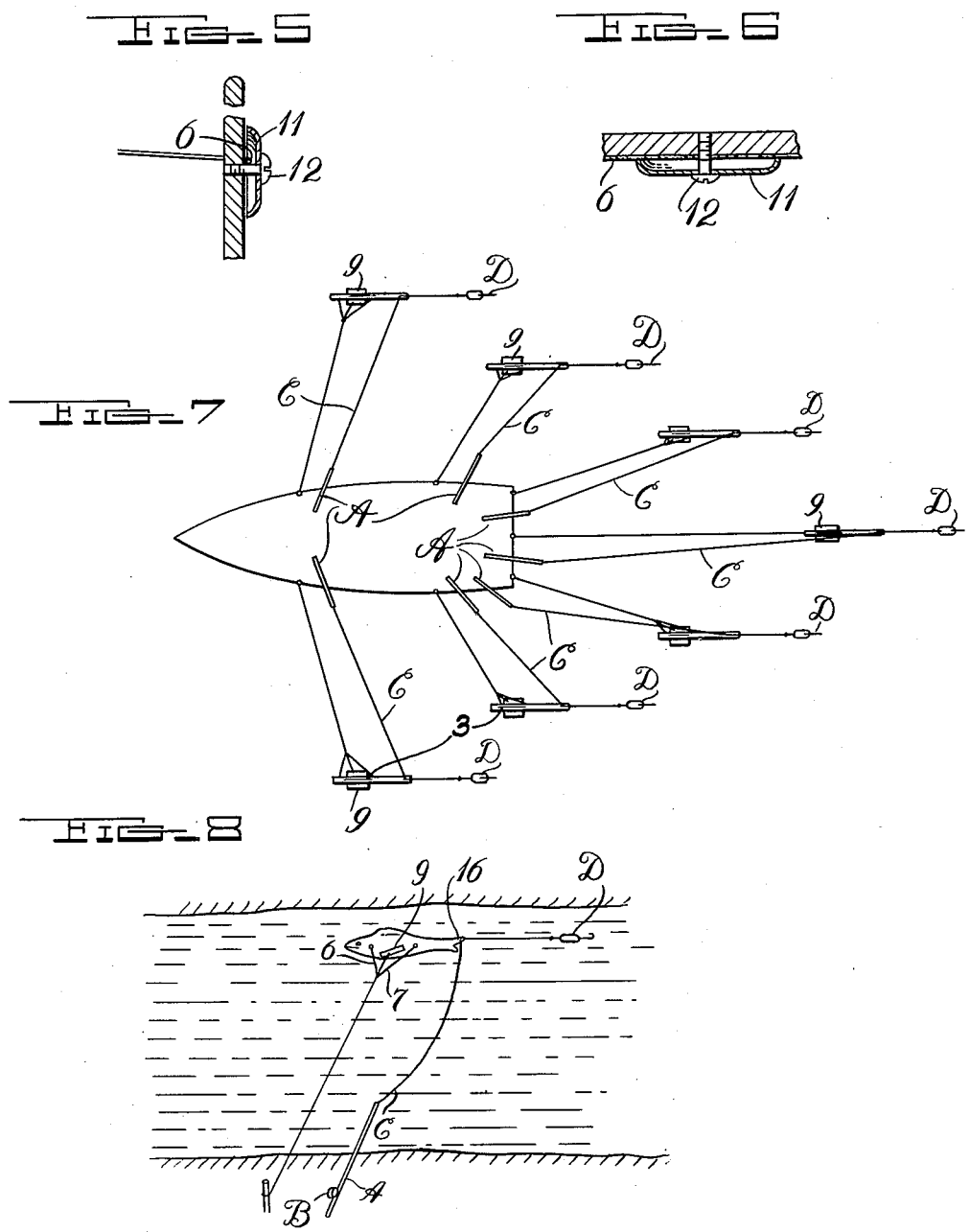
INVENTOR.
CHARLES A. WINSLOW
BY
Ralph T. Bassett
ATTORNEY Patented Mar. 13, 1951

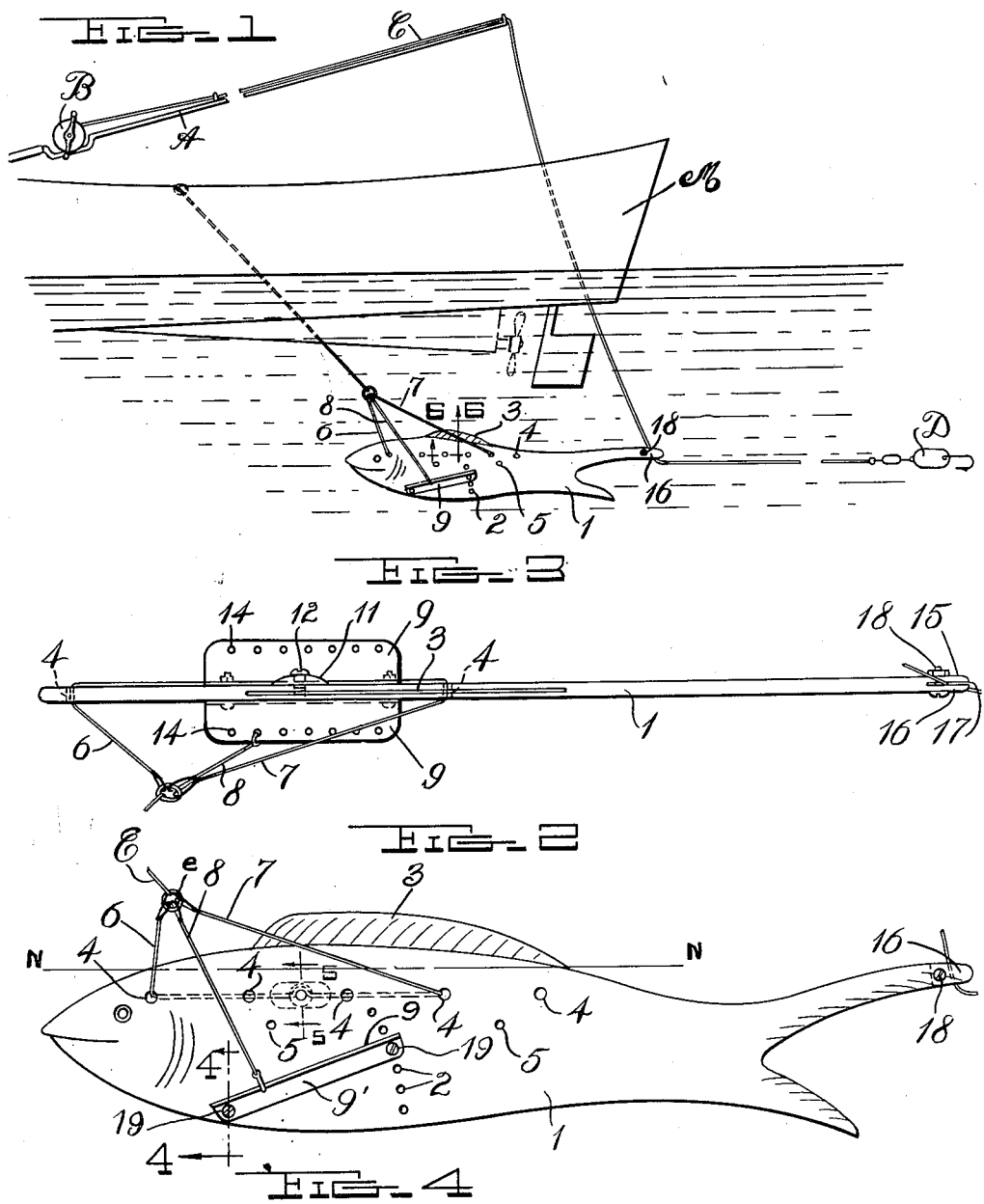
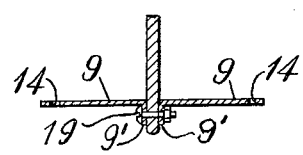

2,545,185

UNITED STATES PATENT OFFICE 2,545,185

TROLLING GEAR

Charles A. Winslow, Oakland, Calif.

Application October 30, 1947, Serial No. 783,069

3 Claims. (Cl. 43—43.13)

This invention relates to a trolling gear suitable for use for sport fishing as well as commercial fishing and is particularly adaptable for use in connection with fishing for salmon, tuna, or the like.

One of the objects of the present invention is to provide a trolling gear which includes a para-fish having means for adjusting its depth when in use and additional means for regulating the direction of travel.

A further object of this invention is to provide a primary large lure, attractor, flasher or para-fish which includes means for releasably carrying a spoon, lure or bait so that upon a strike the spoon line will be released from the para-fish and the fish on the spoon or bait can be played to the limit without interference from complicated ballast, sinkers, and similar equipment.

A still further object of the invention is to provide a para-fish which can be used for stream fishing as well as for deep sea fishing and in which the spoon or lure line can be associated with the para-fish so that it will be automatically released upon a strike or in cases where the device is used for commercial fishing, the spoon line will remain fixed to the para-fish after a strike and the entire gear quickly pulled in to recover the fish on the spoon.

Other objects will more clearly hereinafter appear by reference to the accompanying drawing, forming a part of the specification, and in which like characters of reference designate clearly parts throughout the several views in which:

Figure 1 illustrates the invention in use, including a diagrammatical disclosure of a boat from which the apparatus is being used, Figure 2 is a side elevation, Figure 3 is a top plan view, Figure 4 is a section on line 4—4 of Figure 2, Figure 5 is a section on line 5—5 of Figure 2, Figure 6 is a section on line 6—6 of Figure 1, Figure 7 is a top plan view diagrammatically illustrating a boat from which a plurality of para-fish are being utilized in a fishing operation, and Figure 8 is a view illustrating the device used in stream fishing.

The main element of the assembly is the para-fish or lure which is towed by a suitable cable from a boat as will be more fully hereinafter described. The para-fish or primary lure is relatively large and its body 1, shaped generally to represent a fish, is formed of thin light material such as wood for movement in a vertical position through the water. For certain types of fishing the lure body 1 is made of light wood. When not being towed it normally floats sufficiently near the surface to display the upper portion of the structure including the reflector fin 3, the exposed portion of the body 1 being approximately that part above line N—N in Figure 2. In this case for determining the depth at which the lure is to be submerged or its diving capacity a pair of side fins 9 are provided, and arranged at each side of the body 1 and in a parallel plane. The fins 9 include the downwardly extending flanges 9' which abut the side walls of body 1 and are secured to the body by bolts 19, the latter extending through the flanges 9' and the body 1 at predetermined points and at which points perforations 2 are formed for the shanks of bolts 19. The forward ends of the lateral or wing fins 9 are secured near the front bottom edge of the lure 1 while the rear end of the fins 9 are adjustable vertically as determined by the arcuate row of perforations 2 through which the rear fastener or bolt 19 extends. As is well known to one skilled in the art different conditions as well as different fish are to be found and caught at different depths in the water and thus by providing means for varying the angle of the fins 9 the depth of the lure can be determined. It will also be noted that the speed of the boat towing the lure will tend to vary the depth of the lure and inasmuch as it is desirable to vary the speed of the lure in different kind of fishing and in fishing in different localities it is essential to compensate for these conditions and changes. It is to be understood that for very deep sea fishing heavy fins 9, or ballast, may be used to insure sufficient depth during use to reach the deep running schools of fish.

One of the most important features of this development is the construction and arrangement of the bridle which connects the tow line E with the lure 1. The lure 1 is formed with a horizontal series of perforations 4 arranged above and beyond each end of the position of the wing fins 9 and slightly beneath the line N—N marking the approximate exposed and unexposed portions of the lure when the latter is not in motion. The wing portion of the lateral fins 9 are formed with a series of perforations 14 along their outer marginal edges. The bridle includes the ring e secured to the outer end of the tow cable E, cable 6—7 and brace strap 8. The cable has its end 6 secured to ring e, and passes through two of the perforations indicated by reference character 4 and its end 7 is snapped to the ring e. The brace strap or cable 8 is then snapped at its free ends to the ring e and to the margin of the adjacent fin 9 through a perforation 14. The length of the free ends 6 and 7 of the bridle and the angle of the connection of cable 8 is determined by the fisherman according to variable conditions to secure a proper pressure against the side wall of lure to maintain the latter in proper position with respect to the fixed end of the cable E, and in a forward vertical position under predetermined speed and at idle. When the bridle has been adjusted the shell-like metal clamp 11 is placed over the line and fastened in place by the screw 12 (see Figures 5 and 6). This clamp secures the bridle so that the lure can be pulled from the water without changing the adjustments and so that the same predetermined position will be assumed when returned to the water. This is important when many of these lures are in use from the same boat as will more clearly hereinafter appear. The tail of the lure body 1 is substantially elongated at its upper end to well overhang the lower tail portion. The upper elongated extremity of the tail of the lure is split vertically at 17 and a bolt and nut 18 extends through the split portions to apply tension so that a fishing line can be frictionally retained therein. The conventional fishing apparatus is illustrated as including rod A, reel B and line C and this equipment extends from a boat generally indicated at M.

Under some conditions the bridle 6—7 must be secured to the lure at a lower position than provided by the perforations and for this purpose additional perforations 5 are provided below the perforations 4.

The present trolling gear may be used in either sport or commercial fishing and when desired suitable adjustments can be made for stream fishing as illustrated in Figure 8. For trolling either for sport or commercially the arrangement will approximate the illustration in Figure 7.

It will be desirable to form the fins 9 and perhaps the fin 3 with reflecting surfaces to add to the luring capacity of the para-fish. Also the color of the para-fish will be variegated according to the nature of the fishing or the desire of the fisherman.

When the para-fish is to be used from a boat, such as boat A in the present drawings, the fins 9 will be adjusted at different angles so that the elevation of the various para-fish in the water will vary to prevent tangling of the equipment of the different fishermen. Obviously, if a fisherman from a sporting boat desires to have his trolling at a predetermined depth this can be accomplished by adjustment of the fins 9 and this fisherman can be positioned with respect to the other fishermen on the same side of the boat so that the depth of his para-fish will vary from the depth of the adjacent para-fish. As previously suggested in sport fishing the spoon line indicated at C in the drawings is held frictionally by the jaws 15 and 16 at the tail end of the para-fish so that when a salmon or tuna strikes a spoon D the line will be automatically released, thus leaving the para-fish free to travel in its normal position and permitting the fisherman to play his fish to the extent desired. In commercial fishing where the sole object is to bring in the fish as quickly and efficiently as possible the spoon line C will be firmly clamped by the clamp jaws 15 and 16 so that a strike will not release this line from the clamp. Under these conditions when a strike is made the trolling line C can be pulled in with the tow line of the para-fish and the captured fish brought aboard the boat without the usual "playing" of the fish. The two horizontal rows of perforations and the arcuate row of perforations enable a fisherman to secure maximum adjustments of the bridle and of the fins 9 so that the para-fish may be caused to function in the desired manner.

I claim:

1. A trolling device including a relatively thin, flat, elongated body member having a rearwardly projecting upper portion, said body member being formed with a longitudinally arranged series of spaced perforations at its upper portion and a series of arcuate perforations below the longitudinally arranged perforations, laterally projecting fin members pivotally arranged at one end adjacent the lower edge of said body, said fin members each being provided with an opening at its other end for selective registration with one of the arcuately arranged perforations, fastening means extending through the openings in the fins and projecting into one of the arcuate perforations to provide for the adjustment of the fins, a tow line, a bridle for connecting the tow line to the body member, said bridle including a plurality of flexible straps, one of the straps extending through a pair of said longitudinally arranged perforations and having each end secured to the tow line, means for clamping the strap extending through the longitudinally arranged perforations to the body intermediate a pair of the longitudinal perforations, and one of the flexible straps constituting a brace strap, said brace strap connecting the tow line and the middle portion of one of said fins.

2. A trolling device including a relatively flat body member formed at its upper rearward end with a cable clamp, said body member being provided with longitudinally arranged, spaced perforations at the upper portion of the body, laterally projecting fins pivotally secured adjacent the lower forward edge of said body, means engaging said body for securing said fins in adjusted position, a tow line, a bridle for connecting the tow line to said body, said bridle including a plurality of flexible straps, one of the straps extending through a pair of said spaced longitudinal perforations and having each end secured to the tow line, means for clamping the strap extending through said perforations to said body intermediate said perforations, and one of the flexible straps constituting a brace strap, said brace strap connecting the tow line to a predetermined point in the length of one of said fins.

3. A trolling device including a relatively thin, flat, elongated body member having a rearwardly projecting upper portion, a line clamping member carried by said projecting portion, laterally projecting fins each pivotally secured at one end adjacent the lower front portion of said body, means for securing the other ends of said fins to said body in predetermined, adjusted angular positions, a tow line, a bridle for connecting the tow line to the body, said bridle including a plurality of flexible straps, one of said straps being adjustably clamped to said body and engaging said body at spaced points at opposite sides of said clamp, and one of the flexible straps constituting a brace strap, said brace strap connecting the tow line adjustably to one of said fins.

CHARLES A. WINSLOW.

(References on following page)

REFERENCES CITED

The following references are of record in the file of this patent:

UNITED STATES PATENTS

| Number | Name | Date |
|---|---|---|
| 1,202,631 | Winnie | Oct. 24, 1916 |
| 1,304,983 | Howerton | May 27, 1919 |
| 1,321,850 | Rhodes | Nov. 18, 1919 |
| 1,381,265 | Anderson | June 14, 1921 |
| 2,062,718 | Kallberg | Dec. 1, 1936 |
| 2,187,609 | Larson | Jan. 16, 1940 |
| 2,327,789 | Hixon | Aug. 24, 1943 |
| 2,406,252 | Potter | Aug. 20, 1946 |

FOREIGN PATENTS

| Number | Country | Date |
|---|---|---|
| 537,726 | Great Britain | July 3, 1941 |